United States Patent
Sherlock et al.

(10) Patent No.: US 10,982,409 B2
(45) Date of Patent: Apr. 20, 2021

(54) EXCAVATOR MEASUREMENT AND CONTROL LOGIC

(71) Applicant: Deere & Company, Moline, IL (US)

(72) Inventors: Lance R. Sherlock, Asbury, IA (US); Mark J. Cherney, Dubuque, IA (US); Robert C. Moore, Dickeyville, WI (US)

(73) Assignee: Deere & Company, Moline, IL (US)

( * ) Notice: Subject to any disclaimer, the term of this patent is extended or adjusted under 35 U.S.C. 154(b) by 344 days.

(21) Appl. No.: 15/942,945

(22) Filed: Apr. 2, 2018

(65) Prior Publication Data

US 2019/0301138 A1 Oct. 3, 2019

(51) Int. Cl.
- *E02F 9/20* (2006.01)
- *B66C 13/18* (2006.01)
- *F16L 1/036* (2006.01)
- *E02F 9/26* (2006.01)

(52) U.S. Cl.
CPC ............ *E02F 9/2025* (2013.01); *B66C 13/18* (2013.01); *E02F 9/26* (2013.01); *F16L 1/036* (2013.01)

(58) Field of Classification Search
None
See application file for complete search history.

(56) References Cited

U.S. PATENT DOCUMENTS

| | | |
|---|---|---|
| 6,114,993 A | 9/2000 | Henderson et al. |
| 7,010,873 B2 | 3/2006 | Kinoshita et al. |
| 2004/0158355 A1 | 8/2004 | Holmqvist et al. |
| 2010/0312599 A1 | 12/2010 | Durst |
| 2014/0227104 A1* | 8/2014 | Takahashi ............... E02F 9/207 417/42 |
| 2014/0244098 A1* | 8/2014 | Ueda .................... G06Q 10/047 701/29.3 |
| 2016/0247395 A1* | 8/2016 | Sugihara ................ G07C 5/008 |
| 2016/0299116 A1 | 10/2016 | Talmaki et al. |
| 2017/0060126 A1* | 3/2017 | Marsolek ................ E01C 19/48 |
| 2017/0275848 A1* | 9/2017 | Marquette ............... E02F 3/434 |
| 2019/0080525 A1* | 3/2019 | Sherlock .......... G06Q 10/06312 |
| 2019/0213806 A1* | 7/2019 | Hall ......................... B60P 1/04 |
| 2019/0302794 A1* | 10/2019 | Kean .................... G05D 1/0246 |

FOREIGN PATENT DOCUMENTS

| | | |
|---|---|---|
| DE | 102011002712 A1 | 7/2012 |
| DE | 112011101720 T5 | 3/2013 |
| WO | 2015114909 A1 | 6/2015 |
| WO | 2016159839 A1 | 10/2016 |
| WO | 2016170665 A1 | 10/2016 |

OTHER PUBLICATIONS

German Search Report issued in counterpart application No. 102019203538.8, dated Feb. 19, 2020 (10 pages).

* cited by examiner

*Primary Examiner* — Peter D Nolan
*Assistant Examiner* — Demetra R Smith-Stewart
(74) *Attorney, Agent, or Firm* — Joseph R. Kelly; Kelly, Holt & Christenson PLLC

(57) ABSTRACT

An excavator operating cycle is detected, and a load sensor senses a physical characteristic of a load moved during the operating cycle. The location where the load is moved to is also sensed. An amount of material moved over a set of operating cycles is determined, and an action signal is generated to control the excavator based upon the calculated amount of material.

20 Claims, 7 Drawing Sheets

EXCAVATOR MEASUREMENT AND CONTROL LOGIC

FIELD OF THE DESCRIPTION

The present description relates to construction machines, such as excavators. More specifically, the present description relates to identifying a characteristic of a load being moved by the construction machine and controlling the construction machine accordingly.

BACKGROUND

There are a wide variety of different types of construction machines. Such machines can include, for instance, excavators and other machines that lift and move loads at a worksite. As an example, it is common for an excavator to perform trench digging, pipe laying and backfill operations at a worksite. In doing this, the excavator is often first placed in a digging mode where the excavator digs a trench. The excavator can then be placed in a crane mode where the excavator lifts sections of pipe and places them in the trench. Once the pipe is laid, the excavator can again be placed in a digging mode to backfill the trench and cover the pipe.

There are a wide variety of different types of machine forms, even in excavators. Therefore, it can be difficult to evaluate the performance of a given excavator, or an operator, during operation of the excavator. It can also be difficult to control the operation of the excavator.

The discussion above is merely provided for general background information and is not intended to be used as an aid in determining the scope of the claimed subject matter.

SUMMARY

An excavator operating cycle is detected, and a load sensor senses a physical characteristic of a load moved during the operating cycle. The location where the load is moved to is also sensed. An amount of material moved over a set of operating cycles is determined, and an action signal is generated to control the excavator based upon the calculated amount of material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
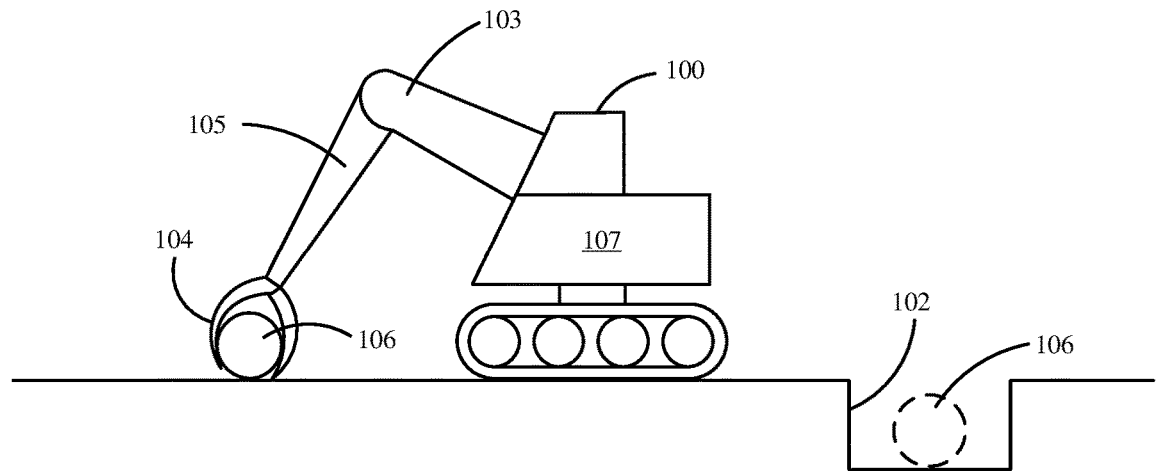
FIGS. 1A and 1B are pictorial illustrations of an excavator performing a pipe laying operation and a backfilling operation, respectively.

FIG. 1A is a side pictorial view of an excavator 100 performing a pipe laying operation. Excavator 100 (or another excavator) has already dug a trench 102 and is fitted with a loading carrying mechanism such as a grapple or other attachment 104 that is used to pick up a length of pipe 106 and place it into trench 102.

Figure 1B:
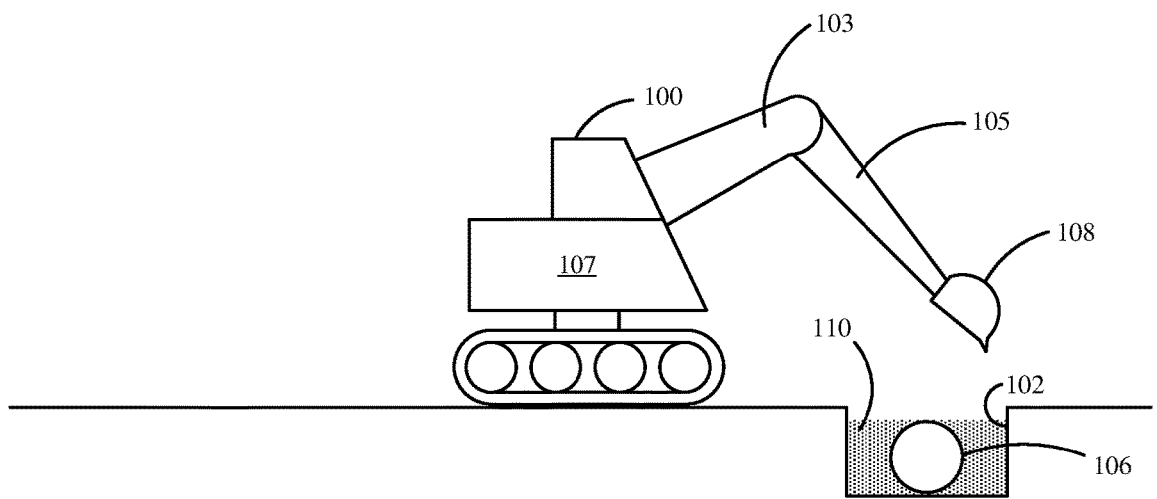

FIG. 1B is a side pictorial view of excavator 100 performing a backfill operation. It can be seen in FIG. 1B that excavator 100 is fitted with a different load carrying mechanism (e.g., a bucket 108) that is used to dig and dump backfill material 110 (such as dirt, rock, etc.). Excavator 100 is illustratively operated by an operator to dig the backfill material 110 from a pile and dump it into trench 102 to cover pipe 106.

In both illustrations, excavator 100 illustratively has actuators, that can be controlled by an operator, that drive movement of linkages 103-105 relative to one another and relative to a frame of excavator 100, and that can swing or pivot the operator's compartment 107 relative to the frame of excavator 100. Excavator 100 also has sensors that sense the position of the linkages 103-105 and operator's compartment 107 relative to one another. Excavator 100 also has controllable actuators that control movement of the load carrying mechanism (such as to control opening and closing of the jaws of the grapple 104), to control the orientation of bucket 108, etc.

During any of the operations shown in FIGS. 1A and 1B, it can be very difficult to determine how much material is moved over any period of time, and how much fuel is being used by the excavator 100 in performing those operations. It may be that an operator performs a great number of pipe laying operations during a particular day. Therefore, having an operator actuate an input mechanism to indicate when a pipe laying operation is being performed may be cumbersome, and error prone. It may also distract the operator's attention. The same is true for performing a backfilling (or other digging) operation. The operator may perform many of these operations in a relatively short period of time, and having the operator attempt to provide a user input, indicating when a digging or dumping operation is performed, is also cumbersome, distracting, and error prone.

Figure 2:
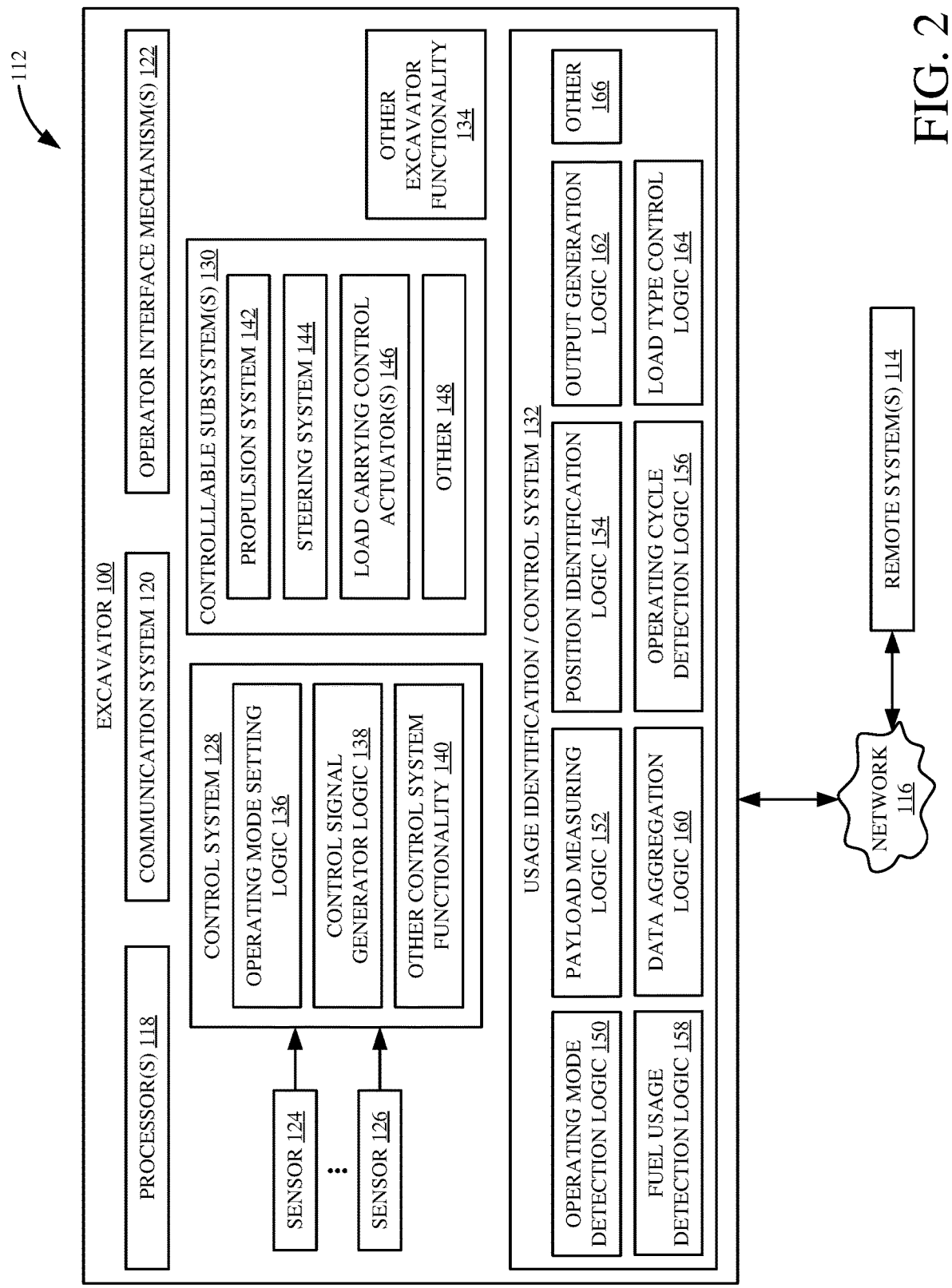
FIG. 2 is a block diagram showing on example of the excavator shown in FIGS. 1A and 1B, deployed in a worksite architecture.

FIG. 2 is a block diagram of a worksite architecture 112. Architecture 112 also includes a block diagram of excavator 100, showing various portions of excavator 100, in more detail. In the architecture shown in FIG. 1, excavator 100 can be coupled to one or more remote systems 114 over network 116. Therefore, network 116 can be a wide area network, a local area network, a near field communication network, a cellular communication network, or any of a wide variety of other networks or combinations of networks. In one example, excavator 100 senses an amount of material it moves with a given operation, and over a set of a plurality of different operations. It also illustratively detects its fuel consumption over those operations. It can generate a set of productivity metrics and communicate those metrics to the one or more remote systems 114 over network 116. It can also generate control signals to control excavator 100, based upon those metrics as well.

Before describing the overall operation of excavator 100 and architecture 112 in more detail, a brief description of some of the items in excavator 100, and their operation, will first be provided. Excavator 100 can include one or more processors 118, communication system 120, operator interface mechanisms 122, a plurality of different sensors 124-126, control system 128, controllable subsystems 130, usage identification/control system 132, and it can include a wide variety of other excavator functionality 134. Control system 128 can, itself, include operating mode detection logic 136, control signal generator logic 138, and it can include other control system functionality 140. Controllable subsystems 130 can include a propulsion system 142 that is used to propel movement of excavator 100, steering system 144 that is used to steer excavator 100, load carrying control actuators 146 (which may be hydraulic cylinders, or a wide variety of other actuators) that are controlled to control the position of linkages 103-105, the swing position of operator's compartment 107, and the operation of a load carrying mechanism attached to excavator 100 (such as a bucket 108, a grapple 104, etc.). Controllable subsystems 130 can include a wide variety of other controllable subsystems 148.

Usage identification/control system 132 illustratively includes operating mode detection logic 150, payload measuring logic 152, position identification logic 154, operating cycle detection logic 156, fuel usage detection logic 158, data aggregation logic 160, output generation logic 162, load type control logic 164, and it can include other items 166.

Operator interface mechanisms 122 can include any of a wide variety of different mechanisms that can be used by an operator to control and manipulate excavator 100. They can, for instance, include levers, linkages, joysticks, buttons, touch-sensitive screens, microphones (where speech recognition is employed), visual, haptic and audio interface mechanisms, among a wide variety of others.

Communication 120 illustratively allows items on excavator 100 to communicate with one another (such as over a controller area network—CAN—bus) and with remote systems 114 or other systems over network 116. Therefore, communication system 120 illustratively includes a system configured to communicate over the various networks and buses to which it is connected.

Sensors 124-126 can include a wide variety of different types of sensors. For instance, they can include a fuel level detection sensor that detects a fuel level or a fuel consumption level, in excavator 100. They can include a position sensor that senses the geographic location of excavator 100 (such as a GPS receiver or another position sensor). Sensors 124-126 also illustratively include position sensors that sense the movement of the various linkages and attachments on excavator 100 relative to one another. In this way, once the geographic location of excavator 100 is known, the geographic location or position of the load being carried by the load carrying mechanism can also be known, because the relative position of the various linkages and actuators on excavator 100 are known, relative to one another, and relative to the position and orientation of excavator 100.

Sensors 124-126 can also include one or more sensors that can identify characteristics of the load being carried by excavator 100. Therefore, they can include strain gauges, actuator position measurement detectors, differential pressure detectors that detect the pressure across a hydraulic cylinder, optical sensors (such as laser sensors, image capture devices, vision-based sensors such as stereo cameras or other cameras), sensors that sense characteristics based on other types of radiation, such as radar, acoustic sensors, etc. Thus, in one example, sensors 124-126 include an image capture device, such as a camera, that can capture an image of the load being carried by the load carrying mechanism on excavator 100. Image processing logic in control system 128 can be used so the image can be compared to other images or it can be otherwise analyzed to identify the type of load that is being carried (such as a metal pipe, PVC pipe, dirt, rocks, other aggregate material, etc.). It can also illustratively be used to identify various characteristics or dimensions of that load, such as the length of a pipe, the weight of the material being carried, its volume, etc.

Operating mode setting logic 136 illustratively receives an operator input through one of operator interface mechanisms 122 setting an operating mode for excavator 100. By way of example, the operating mode may be a digging mode in which excavator 100 is digging the trench 102 or backfilling the trench with material 110. The operating mode may also be a crane mode in which excavator 100 is lifting pipe 106 and laying it in trench 102.

Based upon the sensor inputs, operator inputs, the operating mode, and any of a variety of other inputs, inputs from system 132 (discussed below), control signal generator logic 138 generates control signals to control the controllable subsystems 130. Therefore, it can control the propulsion system 142 to control movement of excavator 100. It can control the steering system 144 to steer excavator 100. It can control the load carrying control actuators 146 to move linkages 103-105, or operator's compartment 107 or to pick up and place a load (such as to pick up pipe 106 and lay it in trench 102, to pick up a load of dirt or backfill material 110 and dump it in trench 102, etc.).

Usage identification/control system 132 illustratively generates measurements or other metrics indicative of how excavator 100 is being operated. The metrics can include productivity metrics indicative of how much material or how many loads the excavator is moving per unit of time, per unit of fuel consumed, over a shift or other given time period, on an operator-by-operator basis, etc. For instance, it can generate a metric indicative of linear feet of pipe laid by excavator 100 per gallon of fuel consumed. This can be used to identify whether the operator is performing efficiently, whether excavator 100 is being operated over uneven terrain, or a wide variety of other things. These metrics can be used to generate control signals to control various functionality on excavator 100.

More specifically, in one example, operating mode detection logic 150 detects the operating mode that operating mode setting logic 136 has placed excavator 100 in, based upon the operator input. It can therefore detect such things as whether the excavator 100 is in a craning mode, a digging mode, etc. Payload measuring logic 152 illustratively measures one or more different characteristics of a load being moved by the load carrying mechanism on excavator 100. It can, for instance, measure or detect the lineal feet of pipe that are being carried in a given load, the weight or volume of backfill material 110, or other characteristics. Logic 152 can identify these things based upon the inputs from the various sensors 124-126 (such as strain gauge sensors that measure the weight of a load, optical or other sensors that sense the volume of a load, the length of the load or other dimensions of the load, etc.).

Position identification logic 154 illustratively identifies the positions where an operation begins, and where it ends. For instance, it may identify the geographic location where a load of backfill material is picked up, and the geographic location of where it is dumped. It may also identify the geographic position of where a pipe 106 is picked up and the geographic position (including the depth) of where that pipe was laid. It can identify other position information as well.

Operating cycle detection logic 156 illustratively detects when an operating cycle begins, and when it ends. For instance, it can use the sensor signal from a weight sensor that senses the weight of a load being carried by the load carrying mechanism of excavator 100 to do this. For instance, when that signal suddenly changes to indicate that a heavy load has just been acquired, this may indicate that a digging operating cycle has just begun. When it changes again to indicate that the load is no longer there, this may indicate that a dumping operating cycle has taken place. The same is true of a pipe laying operating cycle. When a load sensor indicates that a load has been picked up, this may be detected by operating cycle detection logic 156 to indicate that a pipe laying operating cycle has begun (e.g., the length of pipe has just been picked up). When the pipe is laid, this may be detected by the load sensor suddenly showing no load. This may indicate that that particular pipe laying operating cycle has ended. Of course, it will be appreciated that there may be a relatively large number of operations or operating cycles (e.g., dig and dump operations, pipe laying operations) performed during a given work shift. However, by detecting the beginning and end of each of those operating cycles, a relatively detailed metric indicative of efficiency or fuel consumption over individual operating cycles can be generated and used to control excavator 100 as well.

Fuel usage detection logic 158 illustratively receives an input indicative of the level of fuel in excavator 100. It can thus be used to detect changes in that level over a shift, over an individual operating cycle, etc. Those changes can be used by logic 158 to identify a level of fuel usage.

Data aggregation logic 160 illustratively aggregates data over various windows. For instance, it may aggregate the data over a plurality of operating cycles (such as a plurality of dig and dump operating cycles, a plurality of pipe laying operating cycles, etc.). It may aggregate the data over an entire work shift, over an entire project, or over some other parameter. In this way, the various efficiency and usage metrics generated by system 132 can be viewed at different levels of granularity. By way of example, those metrics may be aggregated on an operator-by-operator basis to identify which operators are operating excavator 100 more or less efficiently, etc. They may be aggregated over an entire project to identify wear items that may need maintenance on excavator 100. They may be used to control excavator 100, such as to stop operation of excavator 100 when critical maintenance is needed. They can be used in a wide variety of other ways as well, Load type control logic 164 illustratively uses input from one or more sensors 124-126 to identify a particular load type that is being carried by excavator 100. Load type operations can then be carried out based upon the load type. For example, there may be different types of material (such as dirt, rock, sand, etc.) that can be used as backfill material or that may be moved to different locations on a worksite by an excavator. Similarly, it may be that there are various different pipes (metal, PVC, etc.) on a worksite. It may be that one type of pipe is to be laid at a trench in one geographic location while the other type of pipe is to be laid in a trench in another geographic location. Load type control logic 164 can identify the particular type of load being carried by excavator 100, and it can also detect where that load is (or is about to be) dumped or placed. It can then identify an expected load type that should be dumped or placed at that location and determine whether the proper load type was placed at the proper location.

Identifying what load type should be placed where can be done in a variety of different ways. By way of example, the expected load types may be correlated to geographic positions on a map that maps different types of pipe to different locations on the worksite, different fill material to different locations on the worksite, etc. The map may be stored on excavator 100 or at a remote system 114, or elsewhere. Control logic 164 can control excavator 100 based upon the load type processing. For instance, if excavator 100 has just placed (or is about to place) the wrong kind of pipe in a trench, then logic 164 may generate a control signal to control excavator 100 to stop operation. It may also control an operator interface mechanism 122 to alert the operator of the mistake (or of the imminent mistake), to recommend how to undo the mistake, etc. These types of operations can also be controlled preemptively, such as when logic 164 detects that the operator is about to place a piece of pipe or other material in the wrong location. It can stop the excavator 100 before the mistake is made, alert the operator, and then permit the operator to override the system and place the load there anyway, or to perform a different operation. These are examples only.

Output generation logic 162 illustratively generates outputs indicative of the various data and metrics generated by usage identification and control system 132. Some of these are described in greater detail below.

Figure 3A:
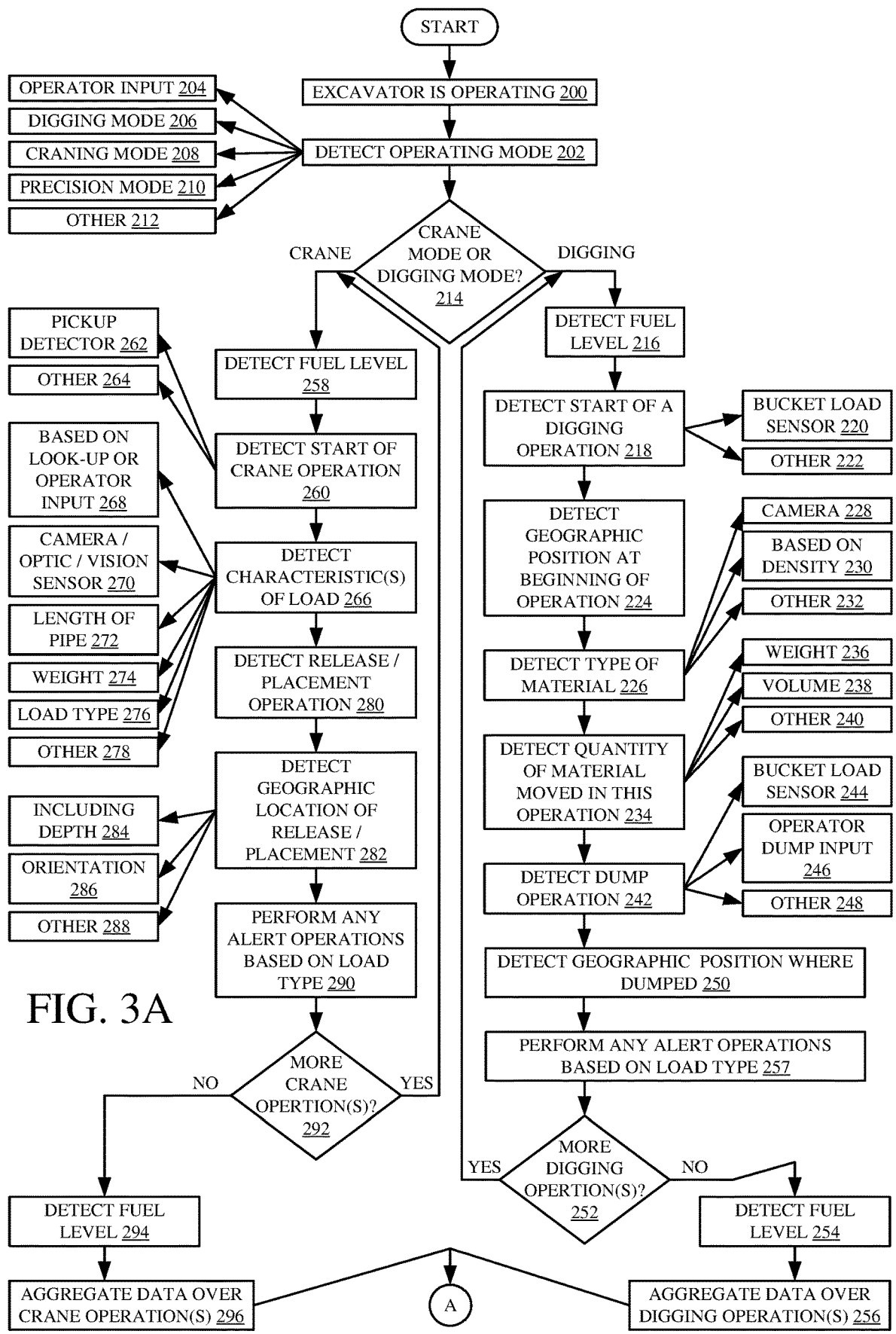
FIGS. 3A and 3B (collectively referred to herein as FIG. 3) illustrate a flow diagram showing one example of the operation of an excavator in generating a utilization and productivity metric and generating an action signal based on that metric.
Figure 3B:
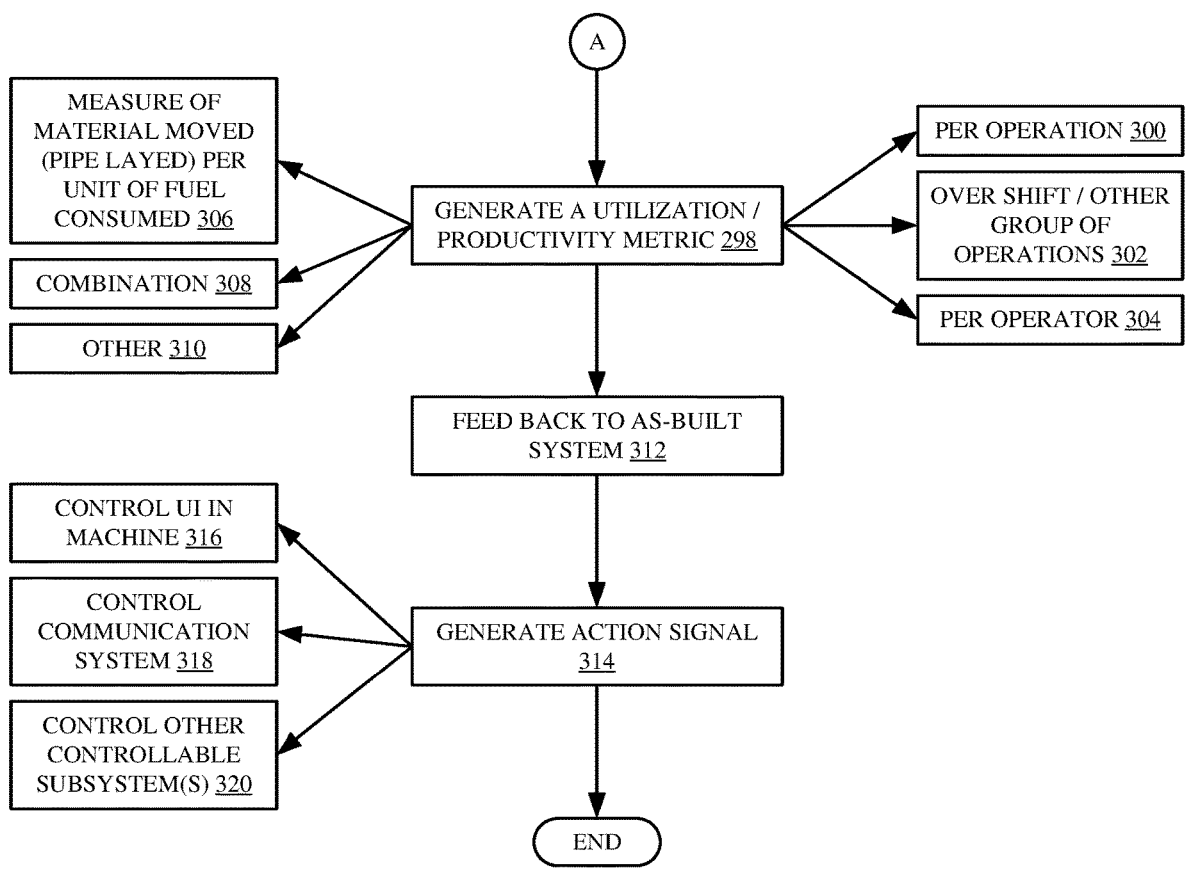

FIGS. 3A and 3B (collectively referred to herein as FIG. 3) show a flow diagram illustrating one example of the operation of excavator 100 in generating usage metrics and using those usage metrics to control excavator 100. It is first assumed that excavator 100 is operating. This is indicated by block 200 in the flow diagram of FIG. 3. Operating mode setting logic 136 has thus set an operating mode and operating mode detection logic 150 then detects the current operating mode of excavator 100. This is indicated by block 202. As mentioned above, the operating mode can be detected based upon an operator input 204 or otherwise. The operating modes can include a digging mode 206 (such as backfill or other digging mode), a craning mode 208, a precision mode 210 in which the controls of excavator 100 are scaled to enhance operator precision, or they can include other modes 212.

Then, for purposes of the present example, operating mode detection logic 150 determines whether excavator 100 is in the crane mode or digging mode, as indicated by block 214. Assume, first, that excavator 100 is in the digging mode. At some point, fuel usage detection logic 150 will access a fuel level sensor to detect the fuel level in excavator 100. This is indicated by block 216. Operating cycle detection logic 150 then detects when a digging operation begins. This is indicated by block 218. In one example, it can use a load detector to detect a load in the bucket of excavator 100. When the load detector increases to indicate that there is a load in the bucket, then operating cycle detection logic 156 may determine that this is the beginning of a digging cycle. Detecting the start of a digging operation based on a bucket load sensor input is indicated by block 220. The beginning of a digging operation can be detected based on a wide variety of other sensor inputs as well, such as a camera input that shows that the bucket is engaging soil, or other sensor inputs. This is indicated by block 222.

Position identification logic 154 then detects a position where the load was taken from. This is indicated by block 224. This can be done a wide variety of ways as well. For instance, if the bucket has its own geographic position sensor on it, then this can be used to identify where the load was taken from when the digging operation began. In another example, when excavator 100 has a position sensor on it (such as a GPS receiver) and when the various linkages between the frame of the excavator and the bucket have position sensors on them to indicate their relative positions with respect to one another, then the geographic position of the bucket can be identified from those values. The geographic position of the bucket where the digging operation began can be detected in other ways as well.

Load type control logic 164 also illustratively detects the type of material being carried by the bucket. This is indicated by block 226. This can be done in a wide variety of ways as well. For instance, in one example, one of sensors 124-126 comprises a camera 228 that takes a visual image of the load. Then, image processing logic can perform image processing to identify the type of load (such as whether it is dirt, rock, sand, etc.). The image processing can be done by comparing the image of the current load against images of loads of different types of material, or it can be done in other ways.

In another example, the type of load can be identified based on a sensor input from a sensor 124-126 that provides the weight or mass of the load. Since the volume of the bucket is known, the density of the load can be estimated as well. The type of load can be detected or estimated based upon its density. This is indicated by block 230. The type of material that constitutes the load can be detected in a wide variety of other ways as well, and this is indicated by block 232.

Payload measuring logic 152 then detects a metric indicative of a quantity of material moved in the present digging operation. This is indicated by block 234. In one example, this can be done based on weight or pressure measurements received from one of sensors 124-126, that sense a weight or hydraulic pressure used to support the load being moved. This is indicated by block 236. In another example, the volume of the load can be detected or estimated and used to obtain the quantity value. This can be done using known measurements for the bucket, using optical or vision-based sensors, or in other ways. The quantity of material being moved can be detected in a wide variety of other ways as well, and this is indicated by block 240.

Operating cycle detection logic 156 then detects a dump operation where the material in the bucket is removed or dumped. This is indicated by block 242. Again, this can be done in a variety of different ways. Similar to detecting when the digging operation started, it can be detected by receiving a sensor signal from one of sensors 124-126 that is indicative of the load in the bucket. Where that sensor signal changes rapidly, to show that the load in the bucket has been removed, operating cycle detection logic 156 can use this to detect the dump operation. This is indicated by block 244. In another example, there may be a user input that is actuated to trigger the dump operation. Detecting actuation of that input is indicated by block 246. The dump operation can be detected using image capture sensors or in a wide variety of other ways as well, and this is indicated by block 248.

Position identification logic 154 then detects the geographic position where the material was dumped. This is indicated by block 250. Again, this can be detected in a similar way to detecting the geographic position where the digging operation began (described above with respect to block 224). It can also be detected in other ways.

Load type control logic 164 then performs any alert or other control operations based upon the load type. This is indicated by block 251. For instance, knowing the position where the load was dumped or placed, it can access a data store, which may include a map identifying the desired placement of different loads at different locations in the worksite. It can use the map to identify an expected load type that was to be placed at that location. If the expected load type does not match the detected load type, then logic 164 can be used to perform a wide variety of other load-type processing alert operations or control operations. Some of these are described in greater detail below with respect to FIG. 4.

At block 252, it is determined whether the digging operation continues. That may be detected by detecting that the position of the bucket has now been moved back to the position where another digging operation is to be started. It may be detected in other ways as well.

If there are more digging operations to be performed, processing reverts to block 216 where the fuel level is again detected. In this way, the fuel consumption per digging operation (or per operating cycle) can be identified. These values can be aggregated to identify the fuel consumption over a plurality of different digging operations, over a shift, or other another period as well. This is described below with respect to block 256.

If, at block 252, it is determined that the digging operations are completed, then again the fuel level is detected as indicated by block 254, and data aggregation logic 160 then performs data aggregation operations to aggregate the data collected over all of the digging operations, or a subset of the digging operations, over a shift, on a per-operator basis, on a combination of different aggregation criteria, or otherwise, as is described above. Aggregating the data is indicated by block 256.

Returning again to block 214, assume now that the excavator 100 is placed in the craning mode so that it is to perform craning operations. Again, at the beginning of the craning operations, fuel usage detection logic 158 detects the fuel level in excavator 100. This is indicated by block 258 in the flow diagram of FIG. 3.

Operating cycle detection logic 156 then detects the start of a craning operation. This is indicated by block 260. In one example, this can be done by receiving a sensor signal from one of sensors 124-126 that sense that a pickup operation has begun (it may sense, for instance, that the jaws of a grapple have been closed). In another example, a load sensor may indicate the load has just been placed on the load carrying mechanism of excavator 100. Detecting the beginning of a craning operating cycle (e.g., picking up an item in the craning operating cycle) using a sensor signal or plurality of different sensor signals is indicated by block 262. The beginning of the operating cycle can be detected in other ways as well, and this is indicated by block 264.

Payload measuring logic 152 then detects a characteristic of the load, or the item or items picked up. This is indicated by block 266. For instance, the type of load picked up may be detected based on a user input, or based upon a sensor signal (such as an image capture sensor) or otherwise. Once the type of load is known, then various measurements (such as its length dimension, diameter or width dimension, weight, etc.) can be obtained from a lookup table or they can be obtained or estimated in other ways. Detecting the characteristic of the load based on an operator input or based on a lookup or other mechanism is indicated by block 268.

In another example, the characteristic of the load can be automatically identified from a sensor signal, such as a camera, another optical or vision-based sensor, or a different type of sensor. By way of example, a camera positioned to obtain an image of a length of pipe that is picked up by the load carrying mechanism of excavator 100 may use image processing to identify the length of that pipe. The characteristic can be identified by other sensors as well, and this is indicated by block 270.

The characteristic of the load can be a wide variety of different characteristics. For instance, where the load is pipe, then it may be the length of the pipe that was picked up. This is indicated by block 272. It may be the weight or volume of the load as indicated by block 274. It may be the load type (such as metal pipe, polyvinyl chloride (PVC) pipe, etc.). This is indicated by block 276. The characteristic can be a wide variety of other characteristics, and it can be detected in a wide variety of other ways, and this is detected by block 278.

Operating cycle detection logic 156 then detects a release or placement operation during which the item being carried in the craning operation is released or placed. This is indicated by block 280. This can be detected in a way similar to when logic 156 detected the pickup operation or the start of the craning operating cycle. For instance, it can be detected based upon a sensor on a grapple indicating that the jaws of the grapple have opened. It can be detected based upon a load measuring sensor indicating that the load was released, or it can be detected in other ways.

Position identification logic 154 then detects the geographic location of the release or placement, to identify the location where the object was placed. This is indicated by block 282. In one example, for instance where the craning operation is to lay pipe in a trench, detecting the position of the placement also includes detecting the depth where the item was released or placed. This is indicated by block 284. In this way, it can be determined that the correct load (the correct type of pipe, for instance) was laid at the correct location, and at the correct depth.

Similarly, in one example, position identification logic 154 identifies the orientation of the item that was just placed. This is indicated by block 286. Again, this can be done using a wide variety of different sensor inputs. For instance, a camera or other image capturing sensor may be used to identify the orientation of the pipe relative to the position of the excavator 100, or relative to an external coordinate system. The geographic location of the release or placement operation can be identified in other ways as well, and this is indicated by block 288.

Load type control logic 164 then performs any alert or other control operations based upon the load type. This is indicated by block 290. For instance, based upon the position where the load was released or placed, it can access a data store, which has a map identifying the desired placement of different loads at different locations in the worksite. It can use the map to identify an expected load type that was to be placed at that location. If the expected load type does not match the detected load type which was actually placed at the location. then logic 164 can be used to perform a wide variety of other load-type processing alert operations or control operations. Some of these are described in greater detail below with respect to FIG. 4.

System 132 then determines whether more crane operating cycles are being performed. If so, processing again reverts to block 258 where the fuel level is detected so that a fuel consumption per operating cycle can be identified. Determining whether the craning operations are continuing is indicated by block 292.

If the craning operations are completed, then again fuel usage detection logic 158 detects the fuel level in excavator 100. This is indicated by block 294. Data aggregation logic 160 then aggregates data over the various crane operations that were performed, and it can aggregate the data over a wide variety of periods as well, some of which were described above with respect to block 256. Aggregating the data over a plurality of different crane operating cycles is indicated by block 296.

Output generation logic 162 then generates a utilization or productivity metric indicative of the utilization or productivity of excavator 100 during its operation. This can be done when excavator 100 is performing digging operations or craning operations, or other operations. Generating the utilization/productivity metric is indicated by block 298 in the flow diagram of FIG. 3.

This metric can vary widely, and the period for which it generated can vary widely as well. For instance, in one example, the metric may be fuel consumption per operating cycle, which indicates the amount of fuel that excavator 100 is using for a given digging operating cycle or a craning operating cycle. This can be generated by aggregating the fuel used over a plurality of different operating cycles and then generating the overall measure, per operating cycle, based upon those individual values. For instance, it may be an average value, a median value, etc. Generating the utilization/productivity metric per operating cycle is indicated by block 300.

The utilization/productivity metric can be generated over an entire shift, or other group of operations. For instance, it may be that the metric is fuel consumption per shift or over another group of operations. This is indicated by block 302. The utilization/productivity metric may be generated on a per operator basis as well. This is indicated by block 304. For instance, it may be that an operator of excavator 100 is identified at the beginning of a shift. Then, the data collected during the time that the operator is operating excavator 100 can be aggregated to identify one or more utilization/productivity metrics for that operator.

In another example, the utilization/productivity metric may be a measure of material moved per unit of fuel consumed. This is indicated by block 306. For instance, where the operation is a digging operation, the utilization/productivity metric may be tons of material moved per unit of fuel consumption. The metric can take a wide variety of other forms as well, such as volume of material moved per unit of fuel consumption, tons of material moved per shift or per operating cycle, volume of material moved per shift or per operating cycle, the amount of material moved per operator, etc.

The utilization/productivity metric may also be generated for different combinations of things. This is indicated by block 308. For instance, the utilization/productivity metric may be generated as a length of pipe laid per unit of fuel consumption, per operator. This is just one example.

The utilization/productivity metric can be generated over different aggregations, in different units, and in different combinations, or in other ways. This is indicated by block 310.

The various utilization/productivity metrics that are generated can then be communicated back into an as-built system which defines how the overall project or worksite is to look when the project is completed. This is indicated by block 312. The as-built system may, for instance, be located in a remote system 114 (shown in FIG. 2). This will allow a manager or other person to identify progress of the project relative to the as-built state of the worksite. This can be used in a wide variety of different ways.

The output of system 132 can then be fed back to control system 128 where control signal generator logic 138 generates an action signal or a control signal based upon the information output by output generation logic 162. This is indicated by block 314. For instance, control signal generator logic 138 can generate a control signal to control an operator interface mechanism 162 in excavator 100 to alert the operator of various items. Some of those are described in greater detail below with respect to FIG. 4. Controlling an operator interface mechanism 122 is indicated by block 316 in the flow diagram of FIG. 3.

Control signal generator logic 138 can control communication system 120 to communicate the information over network 116 to a remote system 114. Controlling the communication system 120 is indicated by block 318. Control signal generator logic 138 can generate control signals to control other controllable subsystems 130 as well. This is indicated by block 320.

Figure 4:
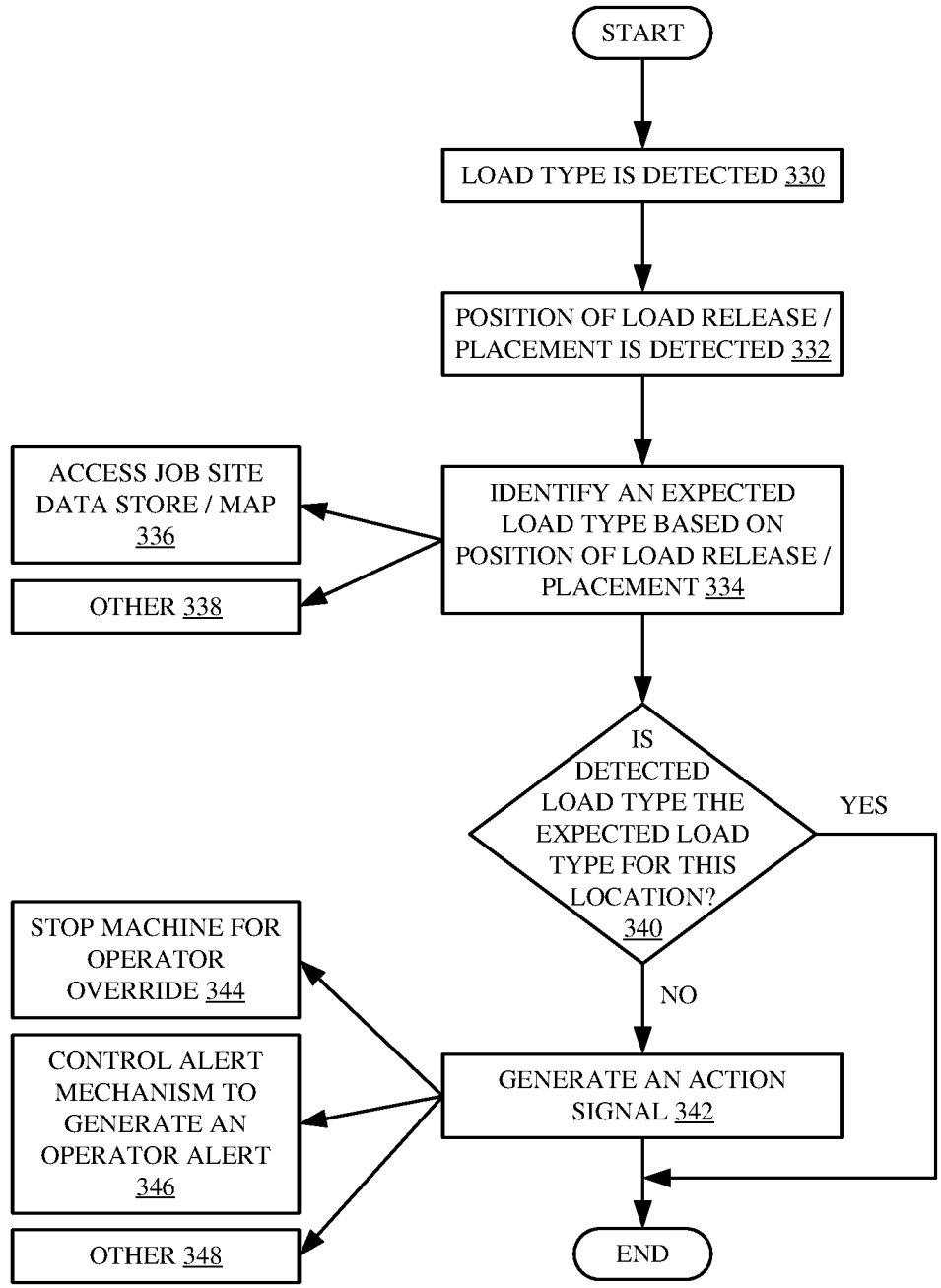
FIG. 4 is a flow diagram illustrating one example of the operation of load type control logic in the excavator.

FIG. 4 is a flow diagram illustrating one example of the operation of load type control logic 164, in performing alert operations based on load type, as indicated by block 251 and 290 described above with respect to FIG. 3. It is therefore first assumed that the load type has been detected. This is indicated by block 330 in the flow diagram of FIG. 4. It is also assumed that the position where the load was released or placed has also been detected. This is indicated by block 332. Some of the ways that the load type and the load position can be detected are described above with respect to FIG. 3.

Load type control logic 164 then detects or identifies an expected load type based upon the position where the load was released or placed. This is indicated by block 334. In one example, logic 164 accesses a job site data store or map that identifies the particular types of load that are to be placed at different locations on the worksite. In this way, it can identify the load type that was expected to be released, dumped or otherwise placed at that location. It can compare that with the load type that was actually placed there to identify whether it is the correct load type. This is indicated by block 336.

For instance, it may be that PVC pipe is to be laid at one location, but metal pipe is to be laid at another location. It may be that a certain type of material is to be dug and dumped at one location while a different type of material is to be used for backfill at a different location. Logic 164 detects whether the proper material was placed at the proper location. Identifying the expected load type based upon the load release position or placement position can be done in other ways as well, and this is indicated by block 338.

Comparing the load type that was actually placed at a location to the expected load type is indicated by block 340. It will be noted that other comparisons can be made as well. For instance, if pipe was to be laid at an expected depth, based upon the worksite map, that can be compared to the actual depth that the pipe was laid. If pipe of a certain length was laid, that can be compared to the expected length. Still other comparisons can also be made.

Continuing on with respect to the example described in FIG. 4, if the detected load type matches the expected load type, then processing is completed. However, if the detected load type does not match the expected load type, then an action signal is generated. This is indicated by block 342. The action signal can be fed back to control signal generator logic 138 which generates a control signal to control the propulsion system 142 of excavator 100 to stop the machine or lock other operators or functions of the machine. This is indicated by block 344.

As discussed above, it will also be noted that these actions can be taken just prior to the release or dump or placement of the load. So, for instance, if it is detected that the operator is about to lay a piece of PVC pipe in a location where a metal pipe should be placed, this can be detected by detecting that the operator has moved the load into that geographic location. The signal generated by logic 164 can then stop the excavator 100, and generate an alert to the operator indicating that it is believed the operator is about to place the wrong type of material at this location. The operator may then be able to override that alert condition to continue on with the placement or dumping operation or perform a different operation. Stopping the machine for operator override is indicated by block 344.

In another example, load type control logic 164 generates an action signal that is provided to control signal generator logic 138. Control signal generator logic 138 then generates a control signal to control an operator interface mechanism 122 to alert the operator that a mistake has been made, or that one is about to be made. This is indicated by block 346. The action signal can be generated in a wide variety of other ways as well, and this is indicated by block 348.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 5:
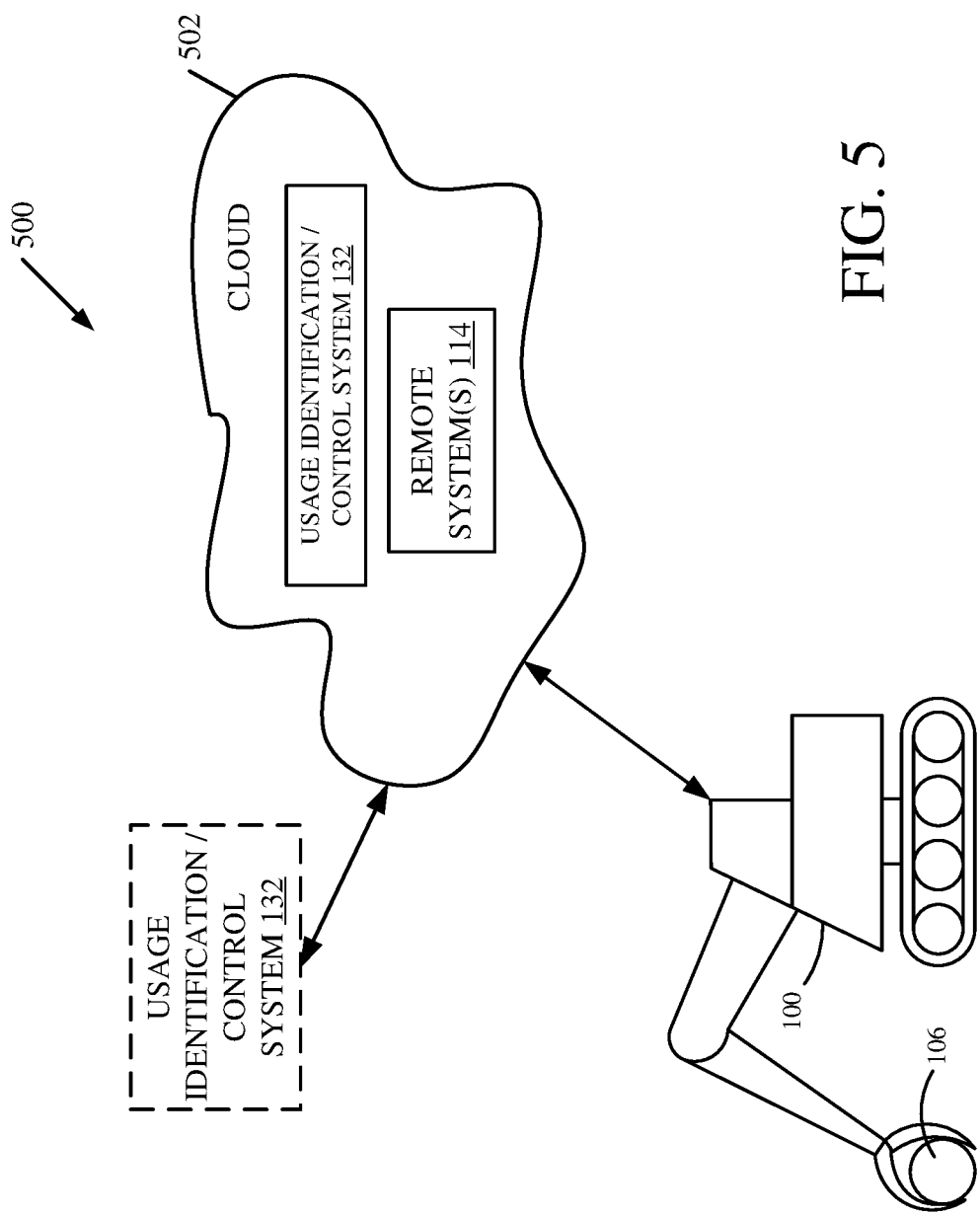
FIG. 5 is a block diagram showing one example of the architecture illustrated in FIG. 2, deployed in a remote computing environment.

FIG. 5 is a block diagram of excavator 100, shown in FIG. 1, except that it communicates with elements in a remote server architecture 500. In an example remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIGS. 1 and 2 and they are similarly numbered. FIG. 5 specifically shows that remote system(s) 114 can be located at a remote server location 502. Therefore, excavator 100 accesses those systems through remote server location 502.

FIG. 5 also depicts another example of a remote server architecture. FIG. 5 shows that it is also contemplated that some elements of FIG. 2 are disposed at remote server location 502 while others are not. By way of example, remote systems 114 or usage identification/control system 132 can be disposed at a location separate from location 502, and accessed through the remote server at location 502. Regardless of where they are located, they can be accessed directly by excavator 100 (or an operator of excavator 100), through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the excavator comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the excavator until the excavator enters a covered location. The excavator, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
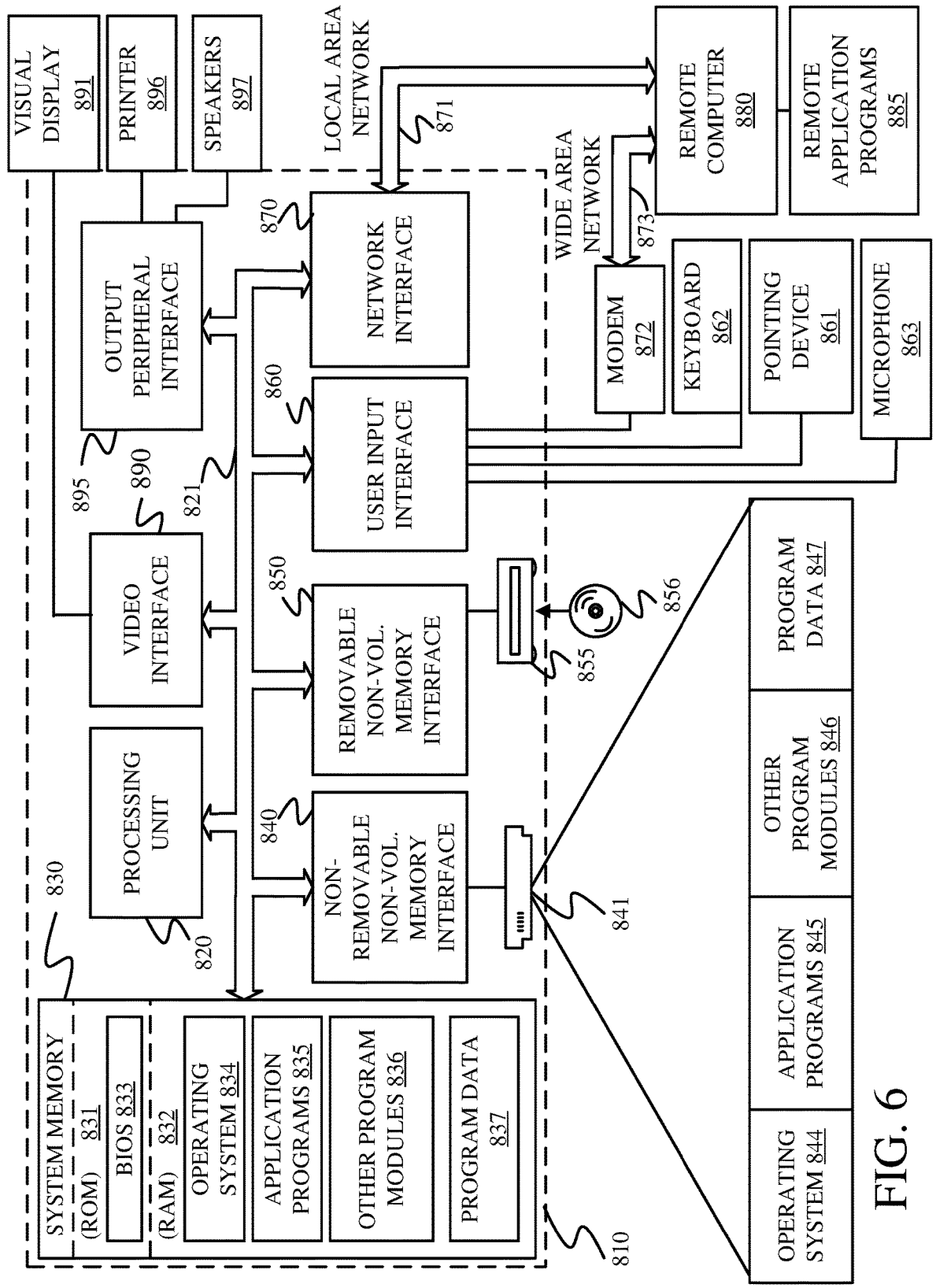
FIG. 6 is a block diagram showing one example of a computing environment that can be used in the architectures shown in the previous figures.

FIG. 6 is one example of a computing environment in which elements of FIG. 2, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processor 118), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 6 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an excavator, comprising:
  operating cycle detection logic receiving an operating cycle signal indicative of an operating cycle performed by the excavator;
  a load type sensor sensing a variable indicative of a load type of a load being moved by the excavator during the operating cycle and generating a load type signal indicative of the sensed variable;
  load measuring logic that detects a physical characteristic indicative of an amount of the load being moved during the operating cycle;
  a usage identification system identifying a production metric based on the amount of the load being moved;
  a controllable subsystem; and
  a control system that generates an action signal to control the controllable subsystem based on the production metric.

Example 2 is the excavator of any or all previous examples wherein the control system comprises:
  load type control logic configured to generate the action signal based on the load type signal, indicative of the load type of the load being moved by the excavator.

Example 3 is the excavator of any or all previous examples and further comprising:
  position identification logic configured to identify a geographic position where the excavator moved the load during the operating cycle and generate a position signal indicative of the identified position.

Example 4 is the excavator of any or all previous examples wherein the load type control logic is configured to generate the action signal based on the load type signal and the position signal.

Example 5 is the excavator of any or all previous examples wherein the load type control logic is configured to identify an expected load type, indicative of an expected type of load to be moved to the identified position, and to compare the expected load type to the load type indicated by the load type signal, and to generate the action signal based on the comparison.

Example 6 is the excavator of any or all previous examples and further comprising:
  a communication system configured to communicate with a remote system;
  data aggregation logic configured to aggregate the production metric over a plurality of operating cycles to obtain an aggregated production metric; and
  output generation logic configured to control the communication system to communicate the aggregated production metric to the remote system.

Example 7 is the excavator of any or all previous examples and wherein the usage identification system comprises:
  fuel usage detection logic configured to receive a fuel level signal indicative of a fuel level and generate a fuel usage metric indicative of an amount of fuel used by the excavator during a set of operating cycles.

Example 8 is the excavator of any or all previous examples wherein the usage identification system is configured to generate the production metric based on the amount of material moved by the excavator during the set of operating cycles and the amount of fuel used by the excavator during the set of operating cycles.

Example 9 is the excavator of any or all previous examples wherein the load type sensor generates the load type signal indicating that the load type is pipe and wherein the load measuring logic is configured to detect, as the physical characteristic of the load, a length of pipe being placed during the operating cycle.

Example 10 is the excavator of any or all previous examples wherein the usage identification system is configured to generate the production metric based on the length of pipe placed by the excavator during the set of operating cycles and the amount of fuel used by the excavator during the set of operating cycles.

Example 11 is the excavator of any or all previous examples wherein the load type sensor generates the load type signal indicating that the load type is material being moved during a digging operation and wherein the load measuring logic is configured to detect, as the physical characteristic of the load, a volume of material being moved during the operating cycle, and wherein the usage identification system is configured to generate the production metric based on the volume of material moved by the excavator during the set of operating cycles and the amount of fuel used by the excavator during the set of operating cycles Example 12 is a method of controlling an excavator, comprising:
  detecting a beginning and an end of an operating cycle performed by the excavator;
  generating an operating cycle signal indicative of the beginning and end of the operating cycle;

sensing a variable indicative of a load type of a load being moved by the excavator during the operating cycle;

generating a load type signal indicative of the sensed variable;

detecting a physical characteristic indicative of an amount of the load being moved during the operating cycle;

identifying a production metric based on the amount of the load being moved; and generating an action signal to control a controllable subsystem on the excavator based on the production metric.

Example 13 is the method of any or all previous examples wherein generating an action signal comprises:

generating the action signal based on the load type signal, indicative of the load type of the load being moved by the excavator.

Example 14 is the method of any or all previous examples and further comprising:

detecting a geographic position where the excavator moved the load during the operating cycle; and generating a position signal indicative of the identified position.

Example 15 is the method of any or all previous examples wherein generating the action signal based on the load type signal comprises generating the action signal based on the load type signal and the position signal by identifying an expected load type, indicative of an expected type of load to be moved to the identified position, and comparing the expected load type to the load type indicated by the load type signal, and to generate the action signal based on the comparison.

Example 16 is the method of any or all previous examples wherein identifying the production metric comprises aggregating the production metric over a plurality of operating cycles to obtain an aggregated production metric, and wherein generating an action signal comprises controlling a communication system to communicate the aggregated production metric to a remote system.

Example 17 is the method of any or all previous examples and wherein identifying the production metric comprises:

receiving a fuel level signal indicative of a fuel level;

generating a fuel usage metric indicative of an amount of fuel used by the excavator during a set of operating cycles; and generating the production metric based on the amount of material moved by the excavator during the set of operating cycles and the amount of fuel used by the excavator during the set of operating cycles.

Example 18 is the method of any or all previous examples wherein the load type signal indicates that the load type is pipe and wherein the physical characteristic of the load comprises a length of pipe being placed during the operating cycle, wherein generating the production metric comprises generate the production metric based on the length of pipe placed by the excavator during the set of operating cycles and the amount of fuel used by the excavator during the set of operating cycles.

Example 19 is a control system that controls operation of a controllable subsystem on an excavator, comprising:

operating cycle detection logic receiving an operating cycle signal indicative of an operating cycle performed by the excavator;

a load type sensor sensing a variable indicative of a load type of a load being moved by the excavator during the operating cycle and generating a load type signal indicative of the sensed variable;

load type control logic configured to generate the action signal based on the load type signal, indicative of the load type of the load being moved by the excavator;

load measuring logic that detects a physical characteristic indicative of an amount of the load being moved during the operating cycle;

a usage identification system identifying a production metric based on the amount of the load being moved; and an action signal generator that generates an action signal to control the controllable subsystem based on the production metric.

Example 20 is the control system of any or all previous examples wherein the usage identification system comprises:

fuel usage detection logic configured to receive a fuel level signal indicative of a fuel level and generate a fuel usage metric indicative of an amount of fuel used by the excavator during a set of operating cycles, the usage identification system being configured to generate the production metric;

a communication system configured to communicate with a remote system; data aggregation logic configured to aggregate the production metric over the set of operating cycles to obtain an aggregated production metric, the aggregated production metric being based on the amount of material moved by the excavator during the set of operating cycles and the amount of fuel used by the excavator during the set of operating cycles; and output generation logic configured to control the communication system to communicate the aggregated production metric to the remote system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An excavator, comprising:

operating cycle detection logic receiving an operating cycle signal indicative of an operating cycle performed by the excavator;

a load type sensor sensing a variable indicative of a load type of a load being moved by the excavator during the operating cycle and generating a load type signal indicative of the sensed variable;

load measuring logic that detects a physical characteristic indicative of an amount of the load being moved during the operating cycle;

fuel usage detection logic that receives a fuel level signal indicative of a fuel level and generates a fuel usage metric indicative of an amount of fuel used by the excavator during the operating cycle;

a usage identification system identifying a production metric based on the amount of the load being moved during the operating cycle and the amount of fuel used during the operating cycle;

a controllable subsystem; and a control system that generates an action signal to control the controllable subsystem based on the production metric.

2. The excavator of claim 1 wherein the control system comprises:

load type control logic configured to generate the action signal based on the load type signal, indicative of the load type of the load being moved by the excavator.

3. The excavator of claim 2 and further comprising:
position identification logic configured to identify a geographic position where the excavator moved the load during the operating cycle and generate a position signal indicative of the identified position.

4. The excavator of claim 3 wherein the load type control logic is configured to generate the action signal based on the load type signal and the position signal.

5. The excavator of claim 4 wherein the load type control logic is configured to identify expected load type, indicative of an expected type of load to be moved to the identified position, and to compare the expected load type to the load type indicated by the load type signal, and to generate the action signal based on the comparison.

6. The excavator of claim 1 and further comprising:
a communication system configured to communicate with a remote system;
data aggregation logic configured to aggregate the production metric over a plurality of operating cycles to obtain an aggregated production metric; and
output generation logic configured to control the communication system to communicate the aggregated production metric to the remote system.

7. The excavator of claim 6 and wherein the fuel usage detection logic is configured to generate a fuel usage metric indicative of an amount of fuel used by the excavator during a set of operating cycles.

8. The excavator of claim 7 wherein the usage identification system is configured to generate the production metric based, on the amount of material moved by the excavator, during the set of operating cycles and the amount of fuel used by the excavator during the set of operating cycles.

9. The excavator of claim 8 therein the load type sensor generates the load type signal indicating that the load type is pipe and wherein the load measuring logic is configured to detect, as the physical characteristic of the load, a length of pipe being placed during the operating cycle.

10. The excavator of claim 9 wherein the usage identification system is configured to generate the production metric based on the length of pipe placed by the excavator during the set of operating cycles and the amount of fuel used by the excavator during the set of operating cycles.

11. The excavator of claim 8 wherein the load type sensor generates the load type signal indicating that the load type is material being moved during a digging operation and wherein the load measuring logic is configured to detect, as the physical characteristic of the load, a volume of material being moved during the operating cycle, and wherein the usage identification system is configured to generate the production metric based on the volume of material moved by the excavator during the set of operating cycles and the amount of fuel used by the excavator during the set of operating cycles.

12. A method of controlling an excavator, comprising:
detecting a beginning and an end of an operating cycle performed by the excavator;
generating an operating cycle signal indicative of the beginning and end of the operating cycle;
sensing a variable indicative of a load type of a load being moved by the excavator during the operating cycle;
generating a load type signal indicative of the sensed variable;
detecting a physical characteristic indicative of an amount of the load being moved during the operating cycle;
receiving a fuel level signal indicative of a fuel level;
generating a fuel usage metric indicative of an amount of fuel used by the excavator during the operating cycle;
identifying a production metric based on the amount of the load being moved and the amount of fuel used; and
generating an action signal to control a controllable subsystem on the excavator based on the production metric.

13. The method of claim 12 wherein generating an action signal comprises:
generating the action signal based on the load type signal, indicative of the load type of the load being moved by the excavator.

14. The method of claim 13 and further comprising:
detecting a geographic position where the excavator moved the load during the operating cycle; and
generating a position signal indicative of the identified position.

15. The method of claim 14 wherein generating the action signal based on the load type signal comprises generating the action signal based on the load type signal and the position signal by identifying an expected load type, indicative of an expected type of load to be moved to the identified position, and comparing the expected load type to the load type indicated by the load type signal, and to generate the action signal based on the comparison.

16. The method of claim 12 wherein identifying the production metric comprises aggregating the production metric over a plurality of operating cycles to obtain an aggregated production metric, and wherein generating an action signal comprises controlling a communication system to communicate the aggregated production metric to a remote system.

17. The method of claim 16 and wherein identifying the production metric comprises:
generating a fuel usage metric indicative of an amount of fuel used by the excavator during a set of operating cycles; and
generating the production metric based on the amount of material moved by the excavator during the set of operating cycles and the amount of fuel used by the excavator during the set of operating cycles.

18. The method of claim 12 wherein the load type signal indicates that the load, type is pipe and wherein the physical characteristic of the load comprises a length of pipe being placed during the operating cycle, wherein generating the production metric comprises generating the production metric based on the length of pipe placed by the excavator during the set of operating cycles and the amount of fuel used by the excavator during the set of operating cycles.

19. A control system that controls operation of a controllable subsystem on an excavator, comprising:
operating cycle detection logic receiving a plurality of operating cycle signal indicative of a plurality of operating cycles performed by the excavator;
a load type sensor sensing a variable indicative of a load type of a load being moved by the excavator during the plurality of operating cycles and generating a load type signal indicative of the sensed variable;
load measuring logic that detects a physical characteristic indicative of an amount of the load being moved during each of the plurality of operating cycles;
fuel usage detection logic configured to receive a fuel level signal indicative of a fuel level and generate a fuel usage metric indicative of an amount of fuel used by the excavator during the plurality of operating cycles;

a usage identification system identifying a production metric based on the amount of the load being moved during the plurality of operating cycles and the amount of fuel used by the excavator during the plurality of operating cycles; and an action signal generator that generates an action signal to control the controllable subsystem based on the production metric.

20. The control system of claim 19 wherein the usage identification system comprises;

a communication system configured to communicate with a remote system; and output generation logic configured to control the communication system to communicate the production metric to the remote system.

* * * * *